(12) United States Patent
Ohno

(10) Patent No.: US 11,364,861 B2
(45) Date of Patent: Jun. 21, 2022

(54) VEHICLE DATA READOUT DEVICE, AND VEHICLE DATA READOUT METHOD

(71) Applicant: HONDA MOTOR CO., LTD., Tokyo (JP)

(72) Inventor: Tetsuya Ohno, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 286 days.

(21) Appl. No.: 16/330,779

(22) PCT Filed: Sep. 4, 2017

(86) PCT No.: PCT/JP2017/031725
§ 371 (c)(1),
(2) Date: Mar. 6, 2019

(87) PCT Pub. No.: WO2018/047755
PCT Pub. Date: Mar. 15, 2018

(65) Prior Publication Data
US 2019/0193654 A1 Jun. 27, 2019

(30) Foreign Application Priority Data

Sep. 9, 2016 (JP) ............................. JP2016-176510

(51) Int. Cl.
*B60R 16/023* (2006.01)
*G07C 7/00* (2006.01)
*G07C 5/08* (2006.01)

(52) U.S. Cl.
CPC ...... *B60R 16/0234* (2013.01); *B60R 16/0238* (2013.01); *G07C 5/08* (2013.01);
(Continued)

(58) Field of Classification Search
CPC ............ B60R 16/0234; B60R 16/0232; B60R 16/0231; B60R 16/023; B60R 16/0238; G07C 5/0841; G07C 2205/02; G07C 7/00
See application file for complete search history.

(56) References Cited

U.S. PATENT DOCUMENTS

2008/0234892 A1* 9/2008 Suzuki .................. G06F 11/004
701/33.4
2014/0371977 A1 12/2014 Sumi et al.
2015/0348339 A1 12/2015 Ohno et al.

FOREIGN PATENT DOCUMENTS

JP H08-218930 A * 8/1996
JP 2008-049731 3/2008
(Continued)

OTHER PUBLICATIONS

Machine Translation of Takashi's reference (JP 2008-049731 A) (Year: 2008).*
(Continued)

*Primary Examiner* — Peter D Nolan
*Assistant Examiner* — Tarek Elarabi
(74) *Attorney, Agent, or Firm* — Amin, Turocy & Watson, LLP

(57) ABSTRACT

Provided are a vehicle data readout device and a vehicle data readout method with which it is possible to reduce power consumption in a state in which a vehicle has not been activated, even if the vehicle data readout device, which receives power from an in-vehicle power source, remains connected to the vehicle. Taking as a trigger a port voltage (Vp) of a readout communication line exceeding a voltage threshold (THv), a vehicle data readout device switches a change-over switch from off to on, to generate a pull-up state by means of a pull-up resistor, and initiates a read-out of operation parameter data (Dp) by a computer.

3 Claims, 5 Drawing Sheets

(52) U.S. Cl.
CPC ............ *G07C 5/0841* (2013.01); *G07C 7/00* (2013.01); *G07C 2205/02* (2013.01)

(56) References Cited

FOREIGN PATENT DOCUMENTS

JP            5573495 B2 *    8/2014
JP            2016-163243      9/2016

OTHER PUBLICATIONS

Machine Translation of Tomohisha's reference (JP 2016-163243 A) (Year: 2016).*
International Search Report and Written Opinion for International Application No. PCT/JP2017/031725 dated Oct. 31, 2017, 9 pages.

* cited by examiner

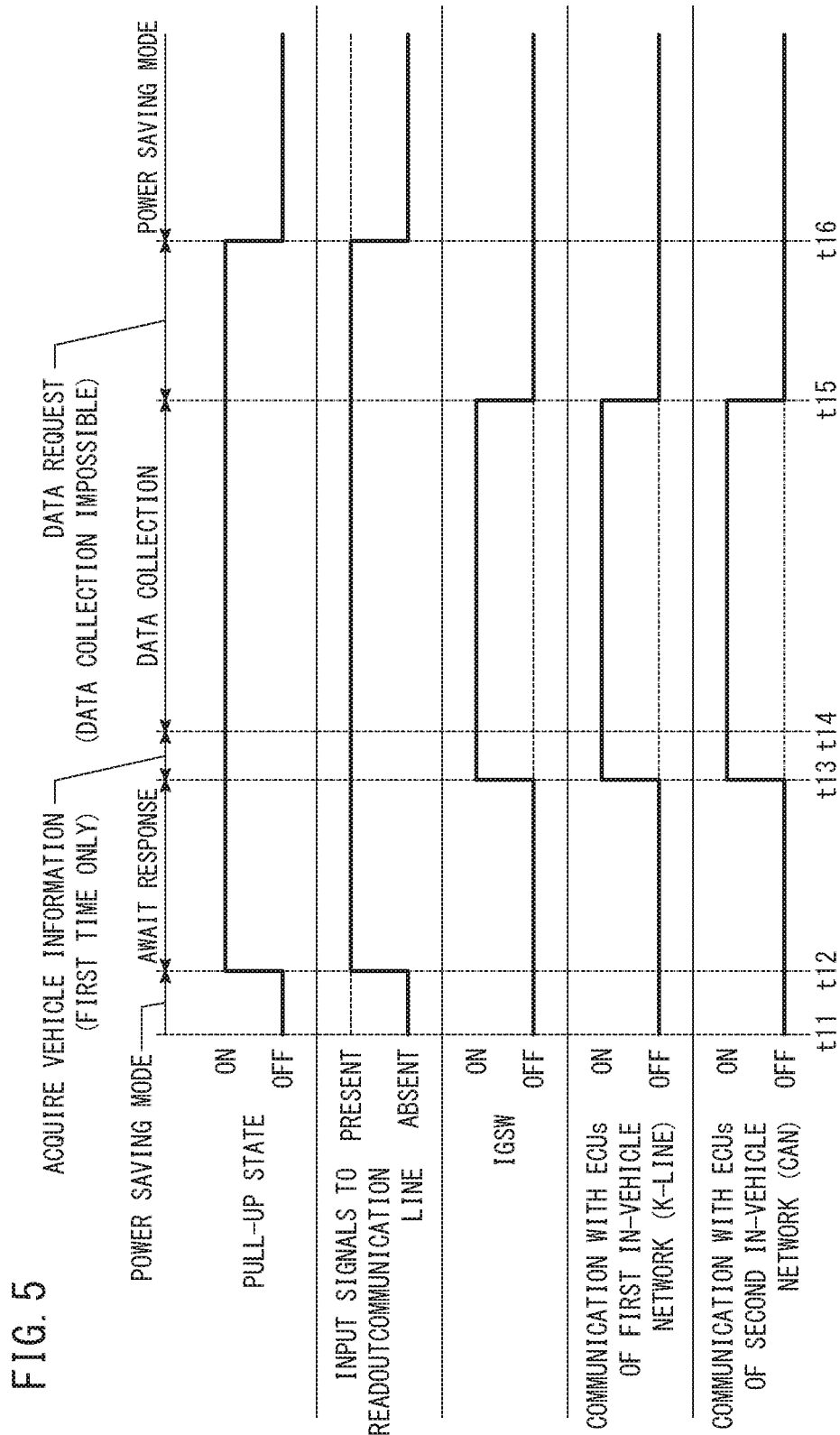

VEHICLE DATA READOUT DEVICE, AND VEHICLE DATA READOUT METHOD

TECHNICAL FIELD

The present invention relates to a vehicle data readout device and a vehicle data readout method in which driving parameter data are read out from at least one electronic control unit (ECU) in a vehicle, and the data are stored in a storage unit or output to the exterior.

BACKGROUND ART

Driving parameter data which are generated during driving of a vehicle have been read out to the exterior of the vehicle by an external device (vehicle data readout device) connected to an in-vehicle network, and such data have been used to perform a diagnosis of the vehicle (see, for example, United States Patent Application Publication No. 2014/0371977 (hereinafter referred to as "US2014/0371977A1") and United States Patent Application Publication No. 2015/0348339 (hereinafter referred to as "US2015/0348339A1")).

As examples of the aforementioned external device (vehicle data readout device), there may be mentioned a data collection device (data logger), an external diagnostic device, and a data transmission device. The data collection device reads out the driving parameter data from the vehicle and stores such data in a storage unit. The stored driving parameter data is transmitted to a separate diagnostic device main body and used for performing a diagnosis of the vehicle or the like. Further, the external diagnostic device has integrally combined therein the data collection device and the diagnostic device main body. Furthermore, the data collection device transmits the driving parameter data that was read out from the vehicle to an external storage device (including a server) without storing the data in a nonvolatile memory.

When the driving parameter data is read out by the vehicle data readout device, the vehicle data readout device is connected to a vehicle side connector (data link connector) for reading out the data. By being connected to a diagnostic device or the like at a dealer's repair shop or the like, the data link connector is used when reading out data such as driving parameter data and trouble codes (DTC) of the in-vehicle ECU, and when rewriting the program data of the in-vehicle ECU. Further, the data link connector also functions as a connector through which an in-vehicle power line that is connected to a vehicle installed power source is connected with an external power line of the vehicle data readout device.

According to US2014/0371977A1, electrical power to operate the data collection device 18 is supplied from a non-illustrated low voltage battery (12V battery) of the vehicle 12 or a power source possessed by the vehicle 12 itself (paragraph [0077]). Further, in either of a case in which electrical power is supplied from the low-voltage battery to a data collection device 18, or a case in which electrical power is possessed by the data collection device 18 itself, the data collection device 18 is automatically turned on at a point in time of being connected to the vehicle 12 (in the case of such a configuration, a starting switch can be omitted) (paragraph [0077]).

According to US2015/0348339A1, no particular switches are provided in the power lines 37 and 92 that extend from the battery 24 to the data collection device 18. For this reason, when connection of the data link connectors 38 and 94 is made, electrical power from the battery 24 of the vehicle 12 is supplied to a data collection device 18, and the data collection device 18 is activated or turned on (paragraph [0127], FIG. 1).

SUMMARY OF INVENTION

As described above, in either of US2014/0371977A1 or US2015/0348339A1, it is disclosed that electrical power is supplied from a vehicle installed power source to the vehicle data readout device. In the case that driving parameter data are read out over a comparatively long period (for example, several days to several weeks) using the vehicle data readout device, power consumption by the vehicle data readout device becomes relatively large. Therefore, in both US2014/0371977A1 and US2015/0348339A1, there is room for improvement in relation to power conservation.

The present invention has been devised taking into consideration the aforementioned circumstances, and has the object of providing a vehicle data readout device and a vehicle data readout method, with which it is possible to reduce power consumption in a state in which a vehicle has not been activated, even if the vehicle data readout device, which receives power from an in-vehicle power source, remains connected to the vehicle.

A vehicle data readout device according to the present invention includes an external connector connected, from the exterior of a vehicle, to a data link connector that is connected to an in-vehicle network including a plurality of electronic control units, an external power line connected to an in-vehicle power source through the data link connector and the external connector, a readout communication line connected to an in-vehicle communication line through the data link connector and the external connector, a computer, which is supplied with electrical power through the external power line, and is configured to read out driving parameter data from at least one of the electronic control units through the readout communication line, and store the driving parameter data in a storage unit or output the driving parameter data to outside, and a pull-up resistor disposed between the external power line and the readout communication line, the vehicle data readout device further including a voltage monitoring circuit configured to monitor whether or not a port voltage of the readout communication line exceeds a voltage threshold value, and to issue a notification to the computer, and a changeover switch connected in series with the pull-up resistor, wherein, taking as a trigger that the port voltage has risen in excess of the voltage threshold value, the vehicle data readout device switches the changeover switch from off to on, to thereby generate a pull-up state by way of the pull-up resistor, together with initiating readout of the driving parameter data by the computer.

According to the present invention, taking as a trigger that the port voltage of the readout communication line connected to the in-vehicle communication line has risen in excess of the voltage threshold value, the pull-up state is generated, and reading out of the driving parameter data is initiated. Stated otherwise, the changeover switch is not turned on simply by connecting the vehicle data readout device to the vehicle via the data link connector and the external connector. Instead, the changeover switch is turned on upon the occurrence of the trigger in which the port voltage of the readout communication line has risen in excess of the voltage threshold value (in other words, upon initiation of signal transmission in the in-vehicle network). Accordingly, it is possible to reduce power consumption in the pull-up resistor and the like, up until the port voltage has exceeded the voltage threshold value (in other words, until signal transmission has been initiated in the in-vehicle network).

Further, according to the present invention, turning the changeover switch on and off is controlled by monitoring the port voltage of the readout communication line. Stated otherwise, initiation of signal transmission in the in-vehicle network (or operation of the vehicle startup switch to turn on the electronic control units) is determined by monitoring the port voltage of the readout communication line. Therefore, as compared to a case in which operation of the vehicle startup switch is monitored using a method other than monitoring the port voltage of the readout communication line, it is possible to simplify the configuration for attaching and detaching the vehicle data readout device with respect to the vehicle.

The computer may maintain a power saving mode until reading out of the driving parameter data is initiated. Further, upon initiating readout of the driving parameter data, the computer may cancel the power saving mode and start transmission of signals to the in-vehicle network.

In accordance with this feature, the computer does not start transmission of signals to the in-vehicle network simply by connecting the vehicle data readout device to the vehicle via the data link connector and the external connector. Instead, signal transmission is started upon the occurrence of the trigger in which the port voltage of the readout communication line has risen in excess of the voltage threshold value (in other words, upon initiation of signal transmission in the in-vehicle network). Accordingly, it is possible to reduce power consumption in the computer, up until the port voltage has exceeded the voltage threshold value (in other words, until signal transmission has been initiated in the in-vehicle network).

After having started readout of the driving parameter data, in the case there is no response from any of the electronic control units, the computer may stop transmission of signals to the in-vehicle network, together with switching the changeover switch from on to off to thereby cancel the pull-up state and bring about a non-pull-up state. In accordance with this feature, when the driving parameter data cannot be read out, it is possible to reduce power consumption by the computer by stopping the transmission of signals with respect to the in-vehicle network, and as a result of being placed in the non-pull-up state, it is possible to reduce power consumption by the pull-up resistor and the like.

When the port voltage exceeds the voltage threshold value in the non-pull-up state, the computer may switch the changeover switch from off to on to thereby cause the pull-up state to occur again, together with restarting reading out of the driving parameter data. In accordance with this feature, in the non-pull-up state, if the port voltage of the readout communication line rises in excess of the voltage threshold value, the pull-up state is restored and reading out of the driving parameter data is restarted. Accordingly, it is possible to quickly read out the driving parameter data when communication with the electronic control units is restored.

The computer may transition to the power saving mode when a predetermined time period has elapsed in a state with the port voltage being less than the voltage threshold value in the non-pull-up state. In accordance with this feature, in the case that the possibility of resumption of communication with the electronic control devices is low due to the vehicle startup switch having been turned off or the like, by switching to the power saving mode, it is possible to reduce power consumption by the computer.

In a vehicle data readout method according to the present invention, there is used a vehicle data readout device, including an external connector connected, from the exterior of a vehicle, to a data link connector that is connected to an in-vehicle network including a plurality of electronic control units, an external power line connected to an in-vehicle power source through the data link connector and the external connector, a readout communication line connected to an in-vehicle communication line through the data link connector and the external connector, a computer, which is supplied with electrical power through the external power line, and is configured to read out driving parameter data from at least one of the electronic control units through the readout communication line, and store the driving parameter data in a storage unit or output the driving parameter data to outside, and a pull-up resistor disposed between the external power line and the readout communication line, the vehicle data readout device further including a voltage monitoring circuit configured to monitor whether or not a port voltage of the readout communication line exceeds a voltage threshold value, and to issue a notification to the computer, and a changeover switch configured to control a pull-up state by switching between generation and termination of a current in the pull-up resistor, wherein, taking as a trigger that the port voltage has risen in excess of the voltage threshold value, the vehicle data readout method includes a step of switching the changeover switch from off to on to thereby generate the pull-up state, together with initiating readout of the driving parameter data by the computer.

BRIEF DESCRIPTION OF DRAWINGS

FIG. 5 is a time chart showing operations or states of each of respective components in the present embodiment.

DESCRIPTION OF EMBODIMENTS

A. Embodiment

<A-1. Configuration>
[A-1-1. Overall Configuration]

Figure 1:
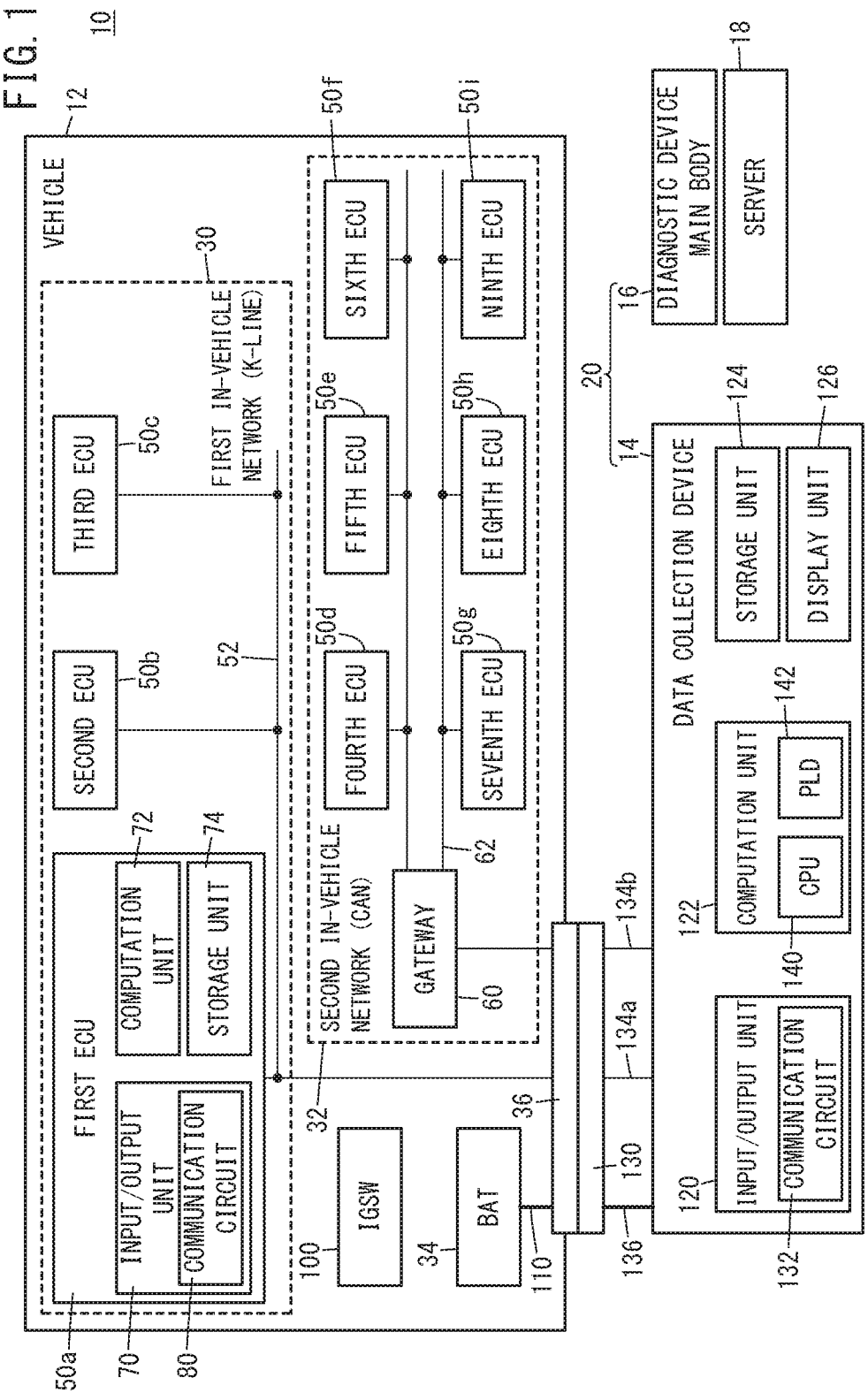
FIG. 1 is a block diagram showing an outline configuration of a diagnostic system including a data collection device as a vehicle data readout device according to an embodiment of the present invention.

FIG. 1 is a block diagram showing an outline configuration of a diagnostic system 10 (hereinafter also referred to as a "system 10") including a data collection device 14 as a vehicle data readout device according to an embodiment of the present invention. In addition to the data collection device 14, the system 10 includes a vehicle 12 as a diagnostic object, a diagnostic device main body 16, and a server 18. The diagnostic device main body 16 performs a fault diagnosis or the like on the vehicle 12, using the data (including driving parameter data Dp) collected by the data collection device 14. Taken together, the data collection device 14 and the diagnostic device main body 16 constitute an external diagnostic device 20. The server 18 provides the information of the vehicle 12 to the external diagnostic device 20.

[A-1-2. Vehicle 12]

(A-1-2-1. Overall Configuration of Vehicle 12)

The vehicle 12 of the present embodiment is a four-wheeled vehicle in the form of a hybrid vehicle having a driving engine and a traction motor (neither of which is shown). Alternatively, the vehicle 12 may be a gasoline vehicle having only the engine and not the traction motor, an electric vehicle (battery vehicle), a fuel cell vehicle, or the like. Further, the vehicle 12 may be a vehicle in the form of a two-wheeled or three-wheeled motorcycle.

The vehicle 12 includes a first in-vehicle network 30, a second in-vehicle network 32, a battery 34, and a data link connector 36. Hereinafter, the first in-vehicle network 30 may also be referred to as a first network 30 or an in-vehicle network 30, and the second in-vehicle network 32 may also be referred to as a second network 32 or an in-vehicle network 32.

(A-1-2-2. First in-Vehicle Network 30 and Second in-Vehicle Network 32)

(A-1-2-2-1. Overview of In-Vehicle Networks 30 and 32)

The first in-vehicle network 30 is a network (K-LINE network) using a K-LINE which is a compliant diagnostic protocol based on the ISO14230 standard. The first network 30 includes a plurality of electronic control units 50*a* to 50*c* (hereinafter referred to as "first to third ECUs 50*a* to 50*c*" or simply "ECUs 50*a* to 50*c*"), and a first in-vehicle communication line 52.

Among the ECUs 50*a* to 50*c*, there are included, for example, a startup ECU, an air conditioner ECU, and an immobilizer ECU. The startup ECU controls starting and stopping of the vehicle 12 in response to an operation made by the driver on a non-illustrated startup switch (for example, an ignition switch) or the like. The air conditioner ECU controls a non-illustrated air conditioner. The immobilizer ECU carries out control of an immobilizer device and a smart key system, neither of which is shown. The smart key system includes a locking device for controlling opening and closing of doors (not shown) of the vehicle 12.

The second in-vehicle network 32 is a CAN (Controller Area Network). The network 32 is configured by combining a so-called high speed communication CAN (hereinafter referred to as a "high speed CAN") as defined by ISO11898 with a so-called low speed communication CAN (hereinafter referred to as a "low speed CAN") as defined by ISO11519. The second network 32 includes a plurality of electronic control units 50*d* to 50*i* (hereinafter referred to as "fourth to ninth ECUs 50*d* to 50*i*" or simply "ECUs 50*d* to 50*i*"), a gateway 60, and a second in-vehicle communication line 62.

Among the ECUs 50*d* to 50*i*, there are included, for example, an engine ECU, a motor ECU, a transmission ECU, a vehicle stability assist ECU (hereinafter referred to as a "VSA ECU), an antilock brake system ECU (hereinafter referred to as an "ABS ECU"), an electric power steering ECU (hereinafter referred to as an "EPS ECU"), a battery ECU, a meter ECU, and a supplemental restraint system ECU (hereinafter referred to as an "SRS ECU"), and the like.

The engine ECU controls the output of the non-illustrated engine. The motor ECU controls the output of the non-illustrated traction motor. The transmission ECU controls a non-illustrated transmission. The VSA ECU implements a vehicle stability assist control. The ABS ECU implements an antilock brake control. The EPS ECU implements a steering assist control. The battery ECU controls charging and discharging of a high voltage battery or a low voltage battery. The motor ECU controls a motor display device (not show) provided on a non-illustrated instrument panel. The SRS ECU carries out control of a non-illustrated air bag system.

The networks 30 and 32 may be other types of networks, such as a LIN (Local Interconnect Network), FlexRay, or the like. Hereinafter, the ECUs 50*a* to 50*i* will be collectively referred to as ECUs 50.

(A-1-2-2-2. ECUs 50)

The respective ECUs 50 each include an input/output unit 70, a computation unit 72, and a storage unit 74. Note that in FIG. 1, the input/output unit 70, the computation unit 72, and the storage unit 74 of only the first ECU 50*a* are shown, and the internal configurations of the other ECUs 50*b* to 50*i* are omitted from illustration.

The input/output unit 70 carries out input and output of signals between its own ECUs 50 and other components (for example, the other ECUs 50, the gateway 60, and the data collection device 14). The input/output unit 70 includes a communication circuit 80 (see FIGS. 1 and 2) for performing communication with other ECUs 50 and the data collection device 14.

Figure 2:
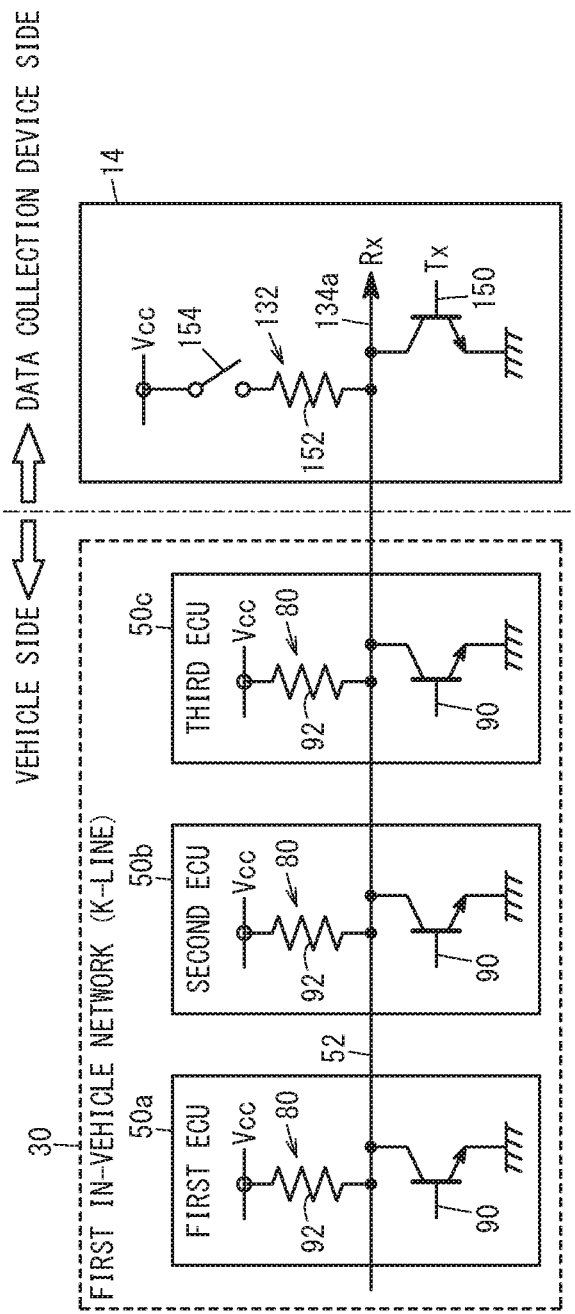
FIG. 2 is a diagram schematically showing a communication circuit of a vehicle, and a communication circuit of the data collection device according to the present embodiment.

As shown in FIG. 2, the communication circuit 80 includes a signal output switching element 90 (hereinafter also referred to as a "switching element 90") and a pull-up resistor 92. In the case that the computation unit 72 outputs a signal (Hi signal) to an external device (the other ECUs 50, the gateway 60, or the data collection device 14), the switching element 90 is turned on. At this time, due to the existence of the pull-up resistor 92, the output signals from the ECUs 50 can be clearly distinguished between Hi and Lo.

Further, in the case that the computation unit 72 receives a signal (Hi signal) from an external device (another ECU 50, the gateway 60, or the data collection device 14), due to the existence of the pull-up resistor 92, the input signals from the external device can clearly be distinguished between Hi and Lo.

By executing a program stored in the storage unit 74, the computation unit 72 serves as a device that controls the ECUs 50 overall as management targets, and for example, includes a central processing unit (CPU).

The storage unit 74 (FIG. 1) stores programs and data that are used by the computation unit 72. The storage unit 74 is equipped, for example, with a random access memory (hereinafter referred to as a "RAM"). As the RAM, a volatile memory such as a register, and a nonvolatile memory such as a flash memory can be used. Further, in addition to the RAM, the storage unit 74 may include a read only memory (hereinafter referred to as a "ROM").

Further, the respective ECUs 50 that are mounted in the vehicle 12 are supplied with power through an ignition switch 100 (hereinafter referred to as an "IGSW 100"). Among the ECUs 50, cases exist in which, even in the event that the IGSW 100 is turned off, the ECUs 50 receive power supplied from the low voltage battery 34 and continue to be activated. In this case, settings are made such that operations, which differ from those when the IGSW 100 is turned on, continue.

(A-1-2-3. Battery 34)

The battery 34 is a low-voltage battery (for example, a 12V battery) used for the purpose of operating low voltage equipment in the vehicle 12. Electrical power from the battery 34 is also supplied to the data collection device 14 via an in-vehicle power line 110 and the data link connector 36.

(A-1-2-4. Data Link Connector 36)

The data link connector 36 (hereinafter also referred to as a "connector 36" or a "DLC 36") is a connector for reading out data on the side of the vehicle 12 to the exterior of the vehicle, and according to the present embodiment, is defined by the ISO15031-3 standard or the SAE standard J1962. The connector 36 includes communication pins used for the first network 30 (K-LINE) and the second network 32 (CAN), and pins for supplying power from the battery 34.

[A-1-3. Data Collection Device 14]

(A-1-3-1. Outline of Data Collection Device 14)

The data collection device 14 reads out various data (including the driving parameter data Dp) from each of the ECUs 50 via the data link connector 36. The data collection device 14 includes an input/output unit 120, a computation unit 122, a storage unit 124, and a display unit 126.

The input/output unit 120 carries out input and output of signals between the data collection device 14 and external devices (for example, the vehicle 12 and the diagnostic device main body 16). The input/output unit 120 has an external connector 130 connected to the data link connector 36 of the vehicle 12, and a communication circuit 132 for communicating with the in-vehicle networks 30 and 32. The communication circuit 132 will be described later with reference to FIGS. 2 and 3.

The external connector 130 is connected to the readout communication lines 134a and 134b, and to an external power line 136. The readout communication line 134a is connected to the first in-vehicle communication line 52 via the DLC 36 and the external connector 130. The readout communication line 134b is connected to the second in-vehicle communication line 62 via the DLC 36 and the external connector 130. The external power line 136 is connected to the in-vehicle power line 110 and the battery 34 (in-vehicle power source) via the DLC 36 and the external connector 130.

By executing a program stored in the storage unit 124, the computation unit 122 serves as a device that controls the data collection device 14 overall, and for example, includes a central processing unit 140 (CPU 140) and a programmable logic device 142 (PLD 142).

The storage unit 124 stores programs and data used by the computation unit 122, and together therewith, stores various data (including the driving parameter data Dp) acquired from the vehicle 12. In the same manner as the storage units 74 of the ECUs 50, the storage unit 124 is equipped, for example, with a RAM. Further, in addition to the RAM, the storage unit 124 may include a ROM.

(A-1-3-2. Communication Circuit 132)

(A-1-3-2-1. Outline of Communication Circuit 132)

FIG. 2 is a diagram schematically showing the communication circuit 80 of the vehicle 12 and the communication circuit 132 of the data collection device 14 according to the present embodiment. It should be noted that FIG. 2 shows only a configuration used for communication between the first in-vehicle network 30 (K-LINE) and the data collection device 14. The configuration used for communication between the second in-vehicle network 32 (CAN) and the data collection device 14 can be configured in the same manner as that shown in FIG. 2.

As shown in FIG. 2, the communication circuit 132 of the data collection device 14 includes a signal output switching element 150 (hereinafter also referred to as a "switching element 150"), a pull-up resistor 152, and a pull-up changeover switch 154.

The functions of the switching element 150 and the pull-up resistor 152 of the data collection device 14 are similar to the functions of the switching element 90 and the pull-up resistor 92 of the ECUs 50. More specifically, when the computation unit 122 of the data collection device 14 outputs a signal (Hi signal) to an external device (the ECUs 50 or the diagnostic device main body 16), the switching element 150 is turned on. At this time, due to the existence of the pull-up resistor 152, the output signals from the ECUs 50 can be clearly distinguished between Hi and Lo.

Further, in the case that the computation unit 122 receives a signal (Hi signal) from an external device (the ECUs 50 or the diagnostic device main body 16), due to the existence of the pull-up resistor 152, the input signals from the external device can clearly be distinguished between Hi and Lo.

The pull-up changeover switch 154 (hereinafter also referred to as a "changeover switch 154") switches between a connected or a disconnected state between the power source (in the present embodiment, the battery 34 of the vehicle 12) and the pull-up resistor 152. Stated otherwise, the changeover switch 154 switches between generation and termination of current in the pull-up resistor 152. As shown in FIG. 2, the changeover switch 154 is disposed between the power source (Vcc) and the pull-up resistor 152. However, for example, insofar as the pull-up resistor 152 and the changeover switch 154 are arranged in series and enable switching between generation and termination of current in the pull-up resistor 152, the changeover switch 154 may be disposed in another position (for example, on a lower side of the pull-up resistor 152 in FIG. 2).

(A-1-3-2-2. Specific Example of Communication Circuit 132)

(A-1-3-2-2-1. Overall Configuration of Communication Circuit 132)

Figure 3:
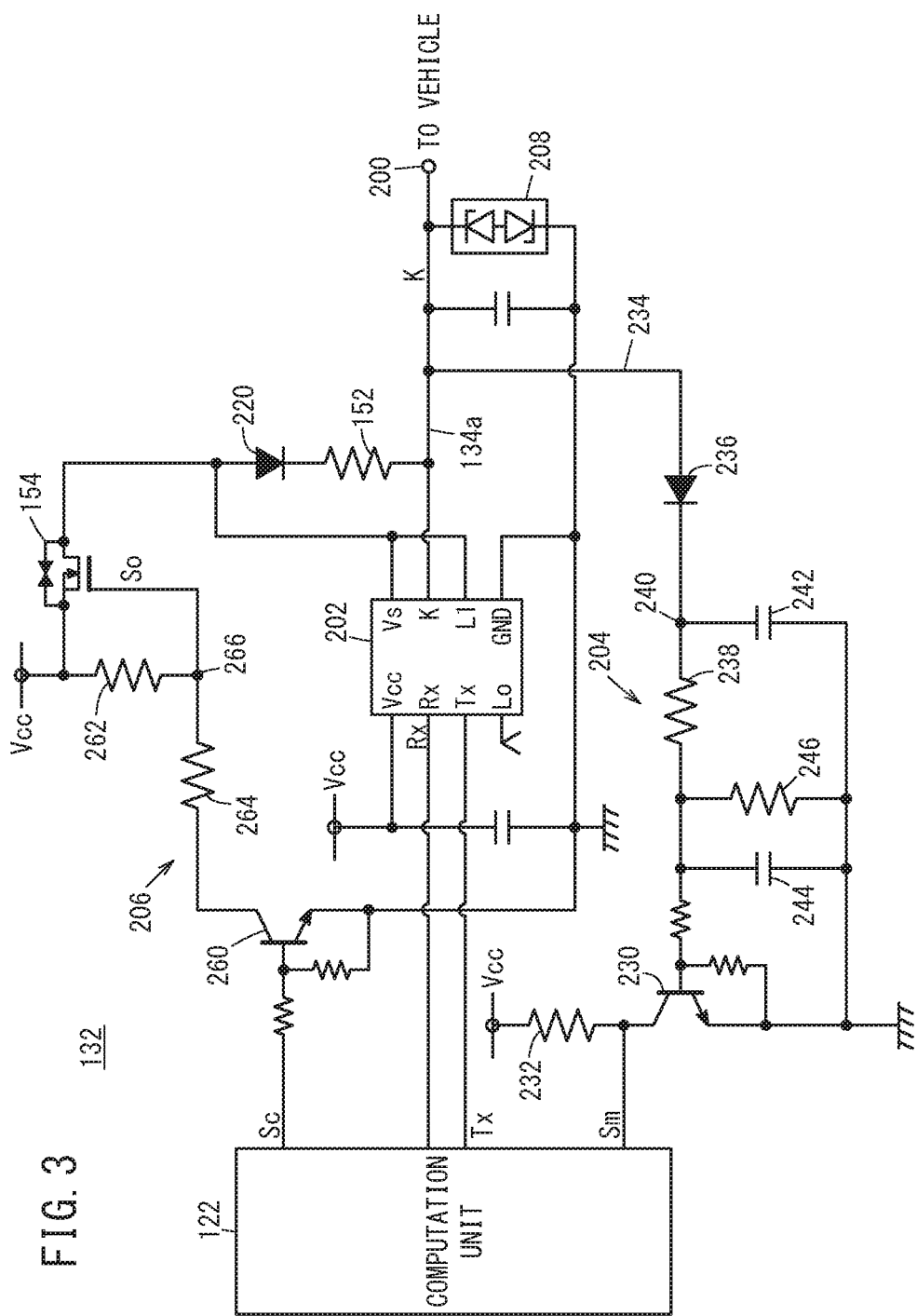
FIG. 3 is a diagram showing a specific example of the communication circuit of the data collection device according to the present embodiment.

FIG. 3 is a diagram showing a specific example of the communication circuit 132 of the data collection device 14 according to the present embodiment. As shown in FIG. 3, the communication circuit 132 includes an input/output port 200, a logic IC 202 including therein the signal output switching element 150 (not shown in FIG. 3), the pull-up resistor 152, a communication line monitoring circuit 204, a pull-up switching circuit 206 including the pull-up changeover switch 154, and a positive/negative voltage input limiter 208.

(A-1-3-2-2-2. Input/Output Port 200)

The input/output port 200 is a port through which inputs and outputs are made to and from the first in-vehicle network 30 of the external connector 130. The input/output port 200 identifies a component provided between input/output pins of the external connector 130 with the first in-vehicle network 30, and the readout communication line 134a connected with the logic IC 202.

(A-1-3-2-2-3. Logic IC 202)

The logic IC 202 is disposed between the first in-vehicle network 30 and the computation unit 122, and performs input and output of signals. In FIG. 3, the signals K are transmission/reception signals (hereinafter also referred to as "transmission/reception signals K") transmitted and received between the first in-vehicle network 30 and the logic IC 202. Hereinafter, signals K as reception signals from the first in-vehicle network 30 to the logic IC 202 may also be referred to as reception signals Krx, and signals K as transmission signals from the logic IC 202 to the first in-vehicle network 30 may also be referred to as transmission signals Ktx.

In FIG. 3, the signals Rx are signals (hereinafter also referred to as "reception signals Rx") which are output from the logic IC 202 to the computation unit 122 responsive to the reception signals Krx. The signals Tx are signals (hereinafter also referred to as "transmission signals Tx") which are output from the computation unit 122 to the logic IC 202. The transmission signals Ktx are generated responsive to the signals Tx.

(A-1-3-2-2-4. Pull-Up Resistor 152)

The pull-up resistor 152 is disposed between the power source (the battery 34 in the present embodiment) and the readout communication line 134a. A reverse current preventative diode 220 is disposed between the pull-up resistor 152 and the pull-up changeover switch 154.

(A-1-3-2-2-5. Communication Line Monitoring Circuit 204)

The communication line monitoring circuit 204 (hereinafter also referred to as a "monitoring circuit 204") detects the signals Krx from the first in-vehicle network 30 to the readout communication line 134a, and issues a notification of the detected state to the computation unit 122 by way of a signal Sm (hereinafter also referred to as a "monitoring signal Sm").

The monitoring circuit 204 (voltage monitoring circuit) is equipped with a monitoring switch 230. The monitoring switch 230 is a switching element disposed between the power source (the battery 34 in the present embodiment) and ground via a resistor 232. A base terminal of the monitoring switch 230 is connected to the monitoring communication line 234 that is connected to the readout communication line 134a. A diode 236 and a resistor 238 are arranged in the monitoring communication line 234. The branch point 240 which is disposed between the diode 236 and the resistor 238 is connected to ground via a capacitor 242.

A capacitor 244 and a resistor 246 are arranged in parallel between the base terminal of the monitoring switch 230 and the resistor 238.

When the input signals Krx from the first in-vehicle network 30 to the readout communication line 134a are input to the base terminal of the monitoring switch 230 via the monitoring communication line 234, the monitoring switch 230 is turned on, and the monitoring signal Sm which is issued with respect to the computation unit 122 becomes Hi. Consequently, the computation unit 122 is capable of recognizing the presence of the input signals Krx (or stated otherwise, the initiation of communications in the first in-vehicle network 30).

(A-1-3-2-2-6. Pull-Up Switching Circuit 206)

In addition to the pull-up changeover switch 154, the pull-up switching circuit 206 includes a pull-up command switch 260. The pull-up command switch 260 is a switching element disposed between the power source (the battery 34 in the present embodiment) and ground via resistors 262 and 264. A branch point 266 which is disposed between the resistors 262 and 264 is connected to a base terminal of the pull-up changeover switch 154.

When a signal Sc (hereinafter also referred to as a "pull-up command signal Sc") from the computation unit 122 is input to the base terminal of the pull-up command switch 260, the pull-up command switch 260 is turned on. Consequently, an on signal So is input to the base terminal of the pull-up changeover switch 154, whereupon the changeover switch 154 is turned on, the pull-up resistor 152 is activated, and the communication circuit 132 is placed in the pull-up state.

(A-1-3-2-2-7. Positive/Negative Voltage Input Limiter 208)

The positive/negative voltage input limiter 208 is made up from two Zener diodes. When an absolute value of the voltage of the input signals Krx from the first in-vehicle network 30 to the logic IC 202 rises in excess of a voltage threshold value, the limiter 208 protects the logic IC 202 by application of a current thereto.

[A-1-4. Diagnostic Device Main Body 16]

The diagnostic device main body 16 performs a fault diagnosis or the like on the vehicle 12 on the basis of the data (including the driving parameter data Dp) collected by the data collection device 14. The diagnostic device main body 16 includes an input/output unit, a communication unit, a computation unit, a storage unit, and a display unit (none of which are shown). The diagnostic device main body 16 can be constituted, for example, from a commercially available notebook type personal computer or a tablet terminal.

The diagnostic device main body 16, for example, can utilize the same configuration as that disclosed in US2014/0371977A1 or US2015/0348339A1.

[A-1-5. Server 18]

The server 18 supplies various information of the vehicle 12 with respect to the external diagnostic device main body 16 responsive to requests from the external diagnostic device main body 16. The server 18 is equipped with an input/output unit, a computation unit, a storage unit, and a display device (none of which are shown). The server 18 is provided with a vehicle database (not shown), in which various information related to the vehicle 12 are stored.

<A-2. Controls of Data Collection Device 14>

Next, a description will be given concerning controls of the data collection device 14. As noted previously, the data collection device 14 reads out various data (including the driving parameter data Dp) from the in-vehicle networks 30 and 32, and stores the data in the storage unit 124.

Figure 4:
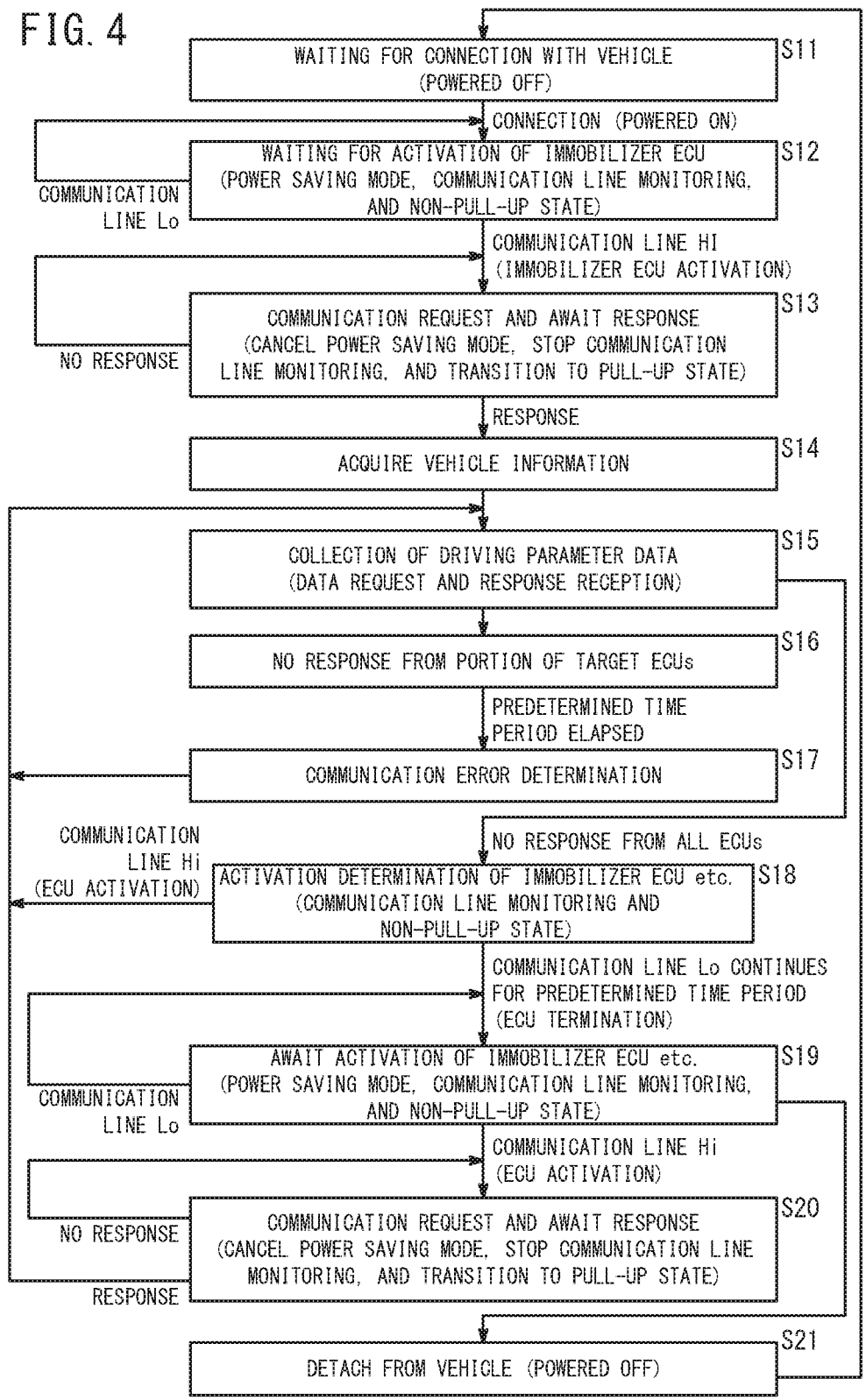
FIG. 4 is a state transition diagram of the data collection device according to the present embodiment.

FIG. 4 is a state transition diagram of the data collection device 14 according to the present embodiment. FIG. 5 is a time chart showing operations or states of each of respective components in the present embodiment. In an uppermost stage of FIG. 5, the pull-up state of the communication circuit 132 of the data collection device 14 is indicated as being either on or off (stated otherwise, as being in either the pull-up state or the non-pull-up state). In the second stage from the top in FIG. 5, the presence or absence of the input signals Krx to the readout communication line 134a is indicated. It should be noted that, from time t12 to time t16 in FIG. 5, although a state is continued in which the input signals Krx are input to the readout communication line 134a, in this instance, the "presence of the input signals Krx" is indicative of a state in which Hi and Lo signals are intermingled (a state in which communications are being carried out). In the third stage from the top in FIG. 5, an on/off state of the IGSW 100 is indicated.

The fourth row from the top in FIG. 5 indicates whether or not the data collection device 14 is carrying out communications with the ECUs 50a to 50c of the first in-vehicle network 30 (K-LINE). The lowermost stage of FIG. 5 indicates whether or not the data collection device 14 is carrying out communications with the ECUs 50d to 50i of the second in-vehicle network 32 (CAN). It should be noted that the occurrence of an ON state in the fourth and the lowermost stages from the top in FIG. 5 is indicative of a state in which communications are in progress (a state in which the Hi and Lo signals are intermingled).

In FIG. 4, an initial state of the data collection device 14 is the state S11, which is a state of waiting for a connection to be made to the vehicle 12. Since the data collection device 14 of the present embodiment does not include its own power source, before the connection is made to the vehicle 12 (state S11), the data collection device 14 is powered off.

When a user connects the external connector 130 to the data link connector 36 of the vehicle 12 to be diagnosed, the data collection device 14 receives supply of power from the battery 34 of the vehicle 12 via the DLC 36 and the external connector 130, and the data collection device 14 is powered on, whereupon a transition is made to state S12. In FIG. 5, at time t11, the external connector 130 has already been connected to the DLC 36.

When the data collection device 14 is powered on, the computation unit 122 transitions to the power saving mode (from time t11 to time t12 in FIG. 5). In the power saving mode, the computation unit 122 stops (or does not start) the output of transmission signals Tx with respect to the in-vehicle networks 30 and 32. In accordance with this feature, it is possible to reduce power consumption by the computation unit 122.

Further, the computation unit 122 does not output the command signal Sc to the pull-up command switch 260 (see FIG. 3) of the communication circuit 132. Therefore, both the pull-up command switch 260 and the pull-up changeover switch 154 are turned off, and the communication circuit 132 is placed in the non-pull-up state. Consequently, it is possible to reduce power consumption in the pull-up resistor 152 and the like.

On the other hand, even in the power saving mode, the computation unit 122 executes monitoring of the monitoring signal Sm (communication line monitoring) from the communication line monitoring circuit 204. More specifically, in state S12, the computation unit 122 is in a state of waiting for the immobilizer ECU which is included in the first in-vehicle network 30 (K-LINE) to be activated.

As described above, according to the present embodiment, basically, the respective ECUs 50 are stopped when the IGSW 100 is turned off. However, when a door of the vehicle 12 is unlocked by a keyless entry system, the immobilizer ECU of the first in-vehicle network 30 is turned on, and a Hi signal is output to the first in-vehicle communication line 52.

Thus, in state S12 of the present embodiment, the data collection device 14 monitors the input of the Hi signal from the immobilizer ECU. Stated otherwise, the data collection device 14 monitors whether or not the port voltage Vp of the readout communication line 134a has exceeded the voltage threshold value THv. More specifically, in the communication line monitoring circuit 204 (see FIG. 3) of the communication circuit 132, it is monitored whether or not a Hi signal has been input to the base terminal of the monitoring switch 230.

In state S12, in the case that the readout communication line 134a is Lo (in other words, if the input signals Krx are not input), the data collection device 14 continues the state S12. In state S12, when the immobilizer ECU is activated and the readout communication line 134a changes from Lo to Hi, a transition is made to state S13 (time t12 in FIG. 5).

In state S13, the computation unit 122 cancels the power saving mode and transitions to the normal mode. Along therewith, the computation unit 122 outputs the command signal Sc to the pull-up command switch 260 (see FIG. 3). Consequently, the pull-up command switch 260 is turned on, the on signal So is output to the pull-up changeover switch 154, and the pull-up changeover switch 154 is also turned on. Accordingly, the communication circuit 132 is placed in the pull-up state. In accordance with this feature, in the communications carried out between the computation unit 122 and the in-vehicle networks 30 and 32, the transmission/reception signals K can clearly be distinguished between Lo and Hi.

After having realized the pull-up state, the computation unit 122 transmits a communication request signal with respect to the in-vehicle networks 30 and 32 via the communication circuit 132 to thereby make a communication request, and waits for a response thereto. The communication request in this instance can be simply the transmission of signals with respect to specified ones of the ECUs 50 or a specified one of the in-vehicle networks 30 and 32 in order to request a response signal. Further, the communication request may be performed as an acquisition of vehicle information Iv in the next state S14.

If there is no response made with respect to the communication request while the IGSW 100 remains turned off, then in the computation unit 122, state S13 of FIG. 4 is continued. In the case that the IGSW 100 is switched ON and a response is issued with respect to the communication request, the computation unit 122 transitions to state S14 (time t13 in FIG. 5).

In state S14 of FIG. 4, the computation unit 122 acquires the vehicle information Iv from specified ones of the ECUs 50 (from time t13 to time t14 in FIG. 5). The vehicle information Iv in this instance includes a vehicle identification number (VIN) as well as vehicle equipment information Iins (hereinafter also referred to as "equipment information Iins").

The equipment information Iins is information in relation to the driving parameter data Dp (diagnostic data), or equipment of the vehicle 12 concerned with the readout conditions. The driving parameter data Dp is acquired at a trigger timing, which is set separately without relation to the generation timing of the trouble codes (DTC). The readout conditions are conditions under which the data collection device 14 reads out the driving parameter data Dp. In the equipment information Iins, there are included, for example, the presence or absence of an idle stop system, and the presence or absence of a turbo function.

It is also possible to carry out a communication request in state S13 of FIG. 4 in the form of a request signal for the VIN or the equipment information Iins. In this case, states S13 and S14 are integrated into a signal state.

Further, in state S13 of FIG. 4, the computation unit 122 terminates monitoring of the monitoring signal Sm (communication line monitoring) from the communication line monitoring circuit 204.

Moreover, as noted previously, the data collection device 14 is used for the collection of the driving parameter data Dp for a comparatively long period (for example, several days to several weeks). For this reason, while the data collection device 14 is connected to the vehicle 12, the ON/OFF operation of the IGSW 100 is repeated a plurality of times. Since it is sufficient for the vehicle information Iv to be acquired once, acquisition of the vehicle information Iv is not carried out repeatedly while the data collection device 14 is continuously connected to the vehicle 12.

When acquisition of the vehicle information Iv is completed, the computation unit 122 collects the driving parameter data Dp from the in-vehicle networks 30 and 32 (from time t14 to time t15 in FIG. 5). More specifically, the computation unit 122 transmits a request signal (data request signal) for specified driving parameter data Dp to the ECUs 50 that serve as targets (hereinafter also referred to as "target ECUs 50tar"). In addition, the computation unit 122 stores in the storage unit 124 the driving parameter data Dp received from the target ECUs 50tar in response to the data request signal.

In the case that collection conditions for the driving parameter data Dp are preset in the data collection device 14, the computation unit 122 collects the driving parameter data Dp only when the collection conditions are satisfied. As examples of such collection conditions, there may be cited an acceleration time, a deceleration time, and the like. As collection conditions at a time of acceleration, for example, a determination is made as to whether or not a time derivative value of the vehicle velocity has become greater than or equal to an acceleration threshold value, or a determination is made as to whether or not an amount by which the accelerator pedal is depressed has become greater than or equal to an amount of depression threshold value. As collection conditions at a time of deceleration, for example, a determination is made as to whether or not the time derivative value of the vehicle velocity has become less than or equal to the acceleration threshold value, or a determination is made as to whether or not an amount by which the brake pedal is depressed has become greater than or equal to an amount of depression threshold value.

The driving parameter data Dp is driving data that is desired to be obtained as diagnostic data, for example, an engine rotational speed, a vehicle velocity, an amount by which the accelerator is operated, and the like.

Further, when collection of the driving parameter data Dp is completed responsive to the collection conditions, the computation unit 122 terminates collection of the driving parameter data Dp. In this case, the computation unit 122 waits for state S21 (detachment from the vehicle 12) of FIG. 4, to be described later. At this time, the computation unit 122 transitions to the power saving mode, and it becomes possible for the communication circuit 132 to transition to the non-pull up state, together with continuing the termination of monitoring of the communication line.

In state S15 of FIG. 4, when responses from any of the target ECUs 50*tar* are terminated (in the case of transitioning from state S15 to state S16), the computation unit 122 continues to transmit the transmission signals Tx for a predetermined time period. In the case that the responses remain terminated (in the case of transitioning from state S16 to state S17) even if the predetermined time period has elapsed, the computation unit 122 determines that a communication error has occurred, and stores the communication error in the storage unit 124.

Even in the case that a communication error has occurred, communications may be returned to a normal state due to the IGSW 100 being turned on again or the like. Therefore, according to the present embodiment, after state S17, the system returns to state S15. Alternatively, the error indication may be continued until the external connector 130 has been temporarily disconnected from the DLC 36 and reconnected again.

In state S15, when responses from all of the target ECUs 50*tar* have stopped, it can be considered that the IGSW 100 has been turned off (time t16 in FIG. 5). In this case, the computation unit 122 switches the changeover switch 154 from on to off to thereby cancel the pull-up state or to bring about the non-pull-up state (state S18). In FIG. 5, the input signals Krx to the readout communication line 134a cease to appear at time t16 which occurs further after the time t15 when the IGSW 100 is turned off. Such a delay takes place because the termination process is still being performed by any of the ECUs 50 immediately after the IGSW 100 has been turned off.

In addition, in state S18 of FIG. 4, the computation unit 122 determines whether or not the readout communication line 134a is Lo during a predetermined time period P. In the case that a portion of the readout communication line 134a has become Hi within the predetermined time period P, the process returns to state S15, and once again the changeover switch 154 is switched from off to on to bring about the pull-up state, and thereafter, the driving parameter data Dp continues to be collected (from time t15 to time t16 in FIG. 5). Stated otherwise, transmission of the request signal for the driving parameter data Dp with respect to the target ECUs 50*tar* is continued.

On the other hand, in the case that the entirety of the readout communication line 134a is Lo during the predetermined time period P, it can be considered that driving of the vehicle 12 has ended and that the doors have been locked. In this case, the computation unit 122 transitions to state S19 (time t16 in FIG. 5). State S19 is the same as state S12. More specifically, the computation unit 122 transitions to the power saving mode, and it becomes possible to initiate monitoring of the communication line, together with causing the communication circuit 132 to transition to the non-pull up state.

In state S19, in the event that the state in which the readout communication line 134a is Lo continues, the computation unit 122 continues to remain in state S19. If the user turns on the smart key and unlocks the doors, the readout communication line 134a becomes Hi again. In this case, the computation unit 122 transitions to state S20. State S20 is the same as state S13. In this case, the computation unit 122 cancels the power saving mode and transitions to the normal mode, terminates monitoring of the communication line, and causes the communication circuit 132 to transition to the pull-up state.

Moreover, the communication request made in state S20 may be a data request signal made with respect to the target ECUs 50*tar*. In this case, state S20 becomes integrated with state S15.

In state S19, in the event that the data collection device 14 is detached from the vehicle 12 (state S21), supply of electrical power from the battery 34 is interrupted, and therefore, the data collection device 14 is powered off. Then, the system returns to state S11 and waits for another connection. Moreover, in order to store data in the storage unit 124 when the data collection device 14 is detached from the vehicle 12, the data collection device 14 may include a power storage device therein such as a capacitor or the like.

<A-3. Effects of the Present Embodiment>

As described above, according to the present embodiment, taking as a trigger that the readout communication line 134a connected to the in-vehicle communication line 52 has become Hi (stated otherwise, the port voltage Vp of the readout communication line 134a has risen in excess of the voltage threshold value THv), the pull-up state is generated (state S13 of FIG. 4, time t12 in FIG. 5), and together therewith, reading out of the driving parameter data Dp is initiated (state S15 of FIG. 4, time t14 in FIG. 5). Stated otherwise, the changeover switch 154 is not turned on simply by connecting the data collection device 14 to the vehicle 12 via the data link connector 36 and the external connector 130 (state S12 of FIG. 4, from time t11 to time t12 in FIG. 5). Instead, the changeover switch 154 is turned on upon the occurrence of the trigger in which the readout communication line 134a has become Hi (stated otherwise, upon initiation of the signals K in the in-vehicle network 30) (state S13 of FIG. 4, time t12 in FIG. 5). Accordingly, it is possible to reduce power consumption in the pull-up resistor 152 and the like, up until the readout communication line 134a has become Hi (in other words, until transmission of the signals K has been initiated in the in-vehicle network 30).

Further, according to the present embodiment, turning the changeover switch 154 on and off is controlled by monitoring the port voltage Vp of the readout communication line 134a. Stated otherwise, initiation of signal transmission in the in-vehicle network 30 (or operation of the IGSW 100

(vehicle startup switch) to turn on the ECUs 50) is determined by monitoring the port voltage Vp of the readout communication line 134a. Therefore, as compared to a case in which operation of the IGSW 100 is monitored using a method other than monitoring the port voltage Vp of the readout communication line 134a, it is possible to simplify the configuration for attaching and detaching the data collection device 14 with respect to the vehicle 12.

In the present embodiment, the computation unit 122 (computer) of the data collection device 14 maintains the power saving mode until reading out of the driving parameter data Dp is initiated (state S12 of FIG. 4, from time t11 to time t12 in FIG. 5). Further, upon initiating readout of the driving parameter data Dp, the computation unit 122 cancels the power saving mode and starts transmission of the transmission signals Tx (or Ktx) with respect to the in-vehicle networks 30 and 32 (state S13 of FIG. 4, time t12 in FIG. 5).

In accordance with this feature, the computation unit 122 does not start transmission of the transmission signals Tx (or Ktx) to the in-vehicle network 30 simply by connecting the data collection device 14 to the vehicle 12 via the data link connector 36 and the external connector 130. Instead, transmission of the signals Ktx is started upon the occurrence of the trigger in which the port voltage Vp of the readout communication line 134a has risen in excess of the voltage threshold value THv (in other words, upon initiation of transmission of the input signals Krx in the in-vehicle communication line 52). Accordingly, it is possible to reduce power consumption in the computation unit 122, up until the port voltage Vp has exceeded the voltage threshold value THv (in other words, until transmission of the input signals Krx has been initiated in the in-vehicle network 30).

In the present embodiment, after having started readout of the driving parameter data Dp, in the case there is no response from any of the target ECUs 50tar, the computation unit 122 (computer) stops transmission of the signals Ktx with respect to the in-vehicle networks 30 and 32, together with switching the changeover switch 154 from on to off to thereby cancel the pull-up state and bring about the non-pull-up state (state S18 of FIG. 4).

In accordance with this feature, when the driving parameter data Dp cannot be read out, it is possible to reduce power consumption by the computation unit 122 by stopping the transmission of the signals K with respect to the in-vehicle networks 30 and 32, and as a result of being placed in the non-pull-up state, it is possible to reduce power consumption by the pull-up resistor 152 and the like.

When the readout communication line 134a becomes Hi (when the port voltage Vp exceeds the voltage threshold value THv) in the non-pull-up state, the computation unit 122 (computer) switches the changeover switch 154 from off to on to thereby cause the pull-up state to occur again, together with restarting reading out of the driving parameter data Dp (states S15→S18→S15 of FIG. 4). In accordance with this feature, in the non-pull-up state, if the port voltage Vp of the readout communication line 134a rises in excess of the voltage threshold value THv, the pull-up state is restored and reading out of the driving parameter data Dp is restarted. Accordingly, it is possible to quickly read out the driving parameter data Dp when communication with the target ECUs 50tar is restored.

In the present embodiment, when the predetermined time period P has elapsed in a state with the readout communication line 134a having become Lo (with the port voltage Vp being less than the voltage threshold value THv) in the non-pull-up state (state S18 of FIG. 4), the computation unit 122 (computer) transitions to the power saving mode (state S19 of FIG. 4, time t16 in FIG. 5). In accordance with this feature, in the case that the possibility of resumption of communication with the target ECUs 50tar is low due to the IGSW 100 (vehicle startup switch) having been turned off or the like, by switching to the power saving mode, it is possible to reduce power consumption by the computation unit 122.

In the present embodiment, after having started readout of the driving parameter data Dp, in the case there is no response from any of the target ECUs 50tar, if the readout communication line 134a is Hi (stated otherwise, if the port voltage Vp exceeds the voltage threshold value THv), the computation unit 122 (computer) maintains the pull-up state (states S15→S18→S15 of FIG. 4, from time t15 to time t16 in FIG. 5). Further, if the readout communication line 134a is Lo (stated otherwise, if the port voltage Vp is less than the voltage threshold value THv), the changeover switch 154 is switched from on to off and the pull-up state is canceled (states S15→S18→S19 of FIG. 4, time t16 in FIG. 5).

Consequently, when the driving parameter data Dp cannot be read out, the pull-up state and the non-pull-up state are switched according to the port voltage Vp of the readout communication line 134a. Accordingly, it is possible to appropriately select the pull-up state or the non-pull-up state, in consideration of the possibility of restoring communication with the target ECUs 50tar.

B. Modifications

The present invention is not limited to the above-described embodiment, and as a matter of course, various alternative or modified configurations could be adopted therein based on the descriptive content of the present specification. For example, the following modified configurations can be adopted.

<B-1. Objects to which the Invention is Applied>

According to the above-described embodiment, it is assumed that the data collection device 14 is used in a vehicle 12 in the form of an automobile (car). However, for example, from the standpoint of reading out predetermined data from a target device, the present invention is not limited to this feature. For example, the vehicle 12 (or the conveying device) may be a movable object such as a ship or an aircraft. Alternatively, the data collection device 14 can be utilized with other devices (for example, various manufacturing devices).

<B-2. Vehicle 12>

In the above-described embodiment, a K-LINE network and a CAN network are used as the in-vehicle networks 30 and 32. However, a network such as LIN, FlexRay, or the like may be used.

In the above-described embodiment, a description was given based on the premise that the IGSW 100 is a rotary switch. However, the IGSW 100 may be a switch such as a push type switch or the like, which is provided in the vehicle 12 as a diagnostic target for actual data collection. Further, although in the narrow sense, the IGSW 100 implies an ignition switch that is used in a vehicle 12 having an engine, in this instance, the IGSW 100 implies a starting switch for the vehicle 12, and can be used with the same method, even if the vehicle 12 is an electric vehicle (EV).

<B-3. Data Collection Device 14>

In the above-described embodiment, the data collection device 14 uses only the battery 34 of the vehicle 12 as a power source (see FIG. 1). However, for example, insofar as attention is focused on use of the pull-up changeover switch 154, the present invention is not limited to this feature. For example, as noted in US2015/0348339A1, it is possible for a capacitor to be provided in the data collection device 14.

In the above-described embodiment, the software that is used by the data collection device 14 is stored in advance in the storage unit 124, however, the present invention is not limited to this feature. For example, the software may be downloaded from an external source, e.g., an external server that can be accessed through a public network, or without being downloaded, may be executed using a so-called ASP (Application Service Provider).

In the above-described embodiment, the data collection device 14 (vehicle data readout device) stores the driving parameter data Dp that was read out from the vehicle 12 in its own storage unit 124 (see FIGS. 1 and 4). However, for example, insofar as attention is focused on use of the pull-up changeover switch 154, the present invention is not limited to this feature. For example, instead of the data collection device 14, a data transmission device may be provided that transmits the driving parameter data Dp that was read out from the vehicle 12 to an external storage device (the server 18, etc.) without storing the data in a nonvolatile memory.

In the above-described embodiment, the pull-up changeover switch 154 is switched between on and off by the pull-up command signal Sc from the computation unit 122 (see FIG. 3). However, for example, insofar as attention is focused on use of the pull-up changeover switch 154, the present invention is not limited to this feature. For example, the monitoring signal Sm from the monitoring switch 230 can be input to the pull-up changeover switch 154. In this case, since the changeover switch 154 is continuously kept on for the predetermined time period during which the monitoring signal Sm changes between Hi and Lo in accordance with the signals K in the in-vehicle networks 30 and 32, a capacitor can be provided which is disposed or connected between the monitoring switch 230 and the changeover switch 154.

<B-4. Other Considerations>

In the above-described embodiment, cases exist in which an equal sign is included or not included in the numerical comparisons. However, for example, if there is no special reason for including or excluding such an equal sign (or stated otherwise, for cases in which the effects of the present invention are obtained), it can be set arbitrarily as to whether to include an equal sign in the numerical comparisons.

As to what this implies, for example, even if the determination of (Vp>THv) in step S12, etc., of FIG. 4 as to whether or not the port voltage Vp is in excess of the threshold value THv is changed to a determination of (Vp≥THv) as to whether or not the port voltage Vp is greater than or equal to the voltage threshold value THv, both determinations produce substantially the same effect.

C. Description of Reference Numerals

12 . . . vehicle
14 . . . data collection device (vehicle data readout device)
30 . . . first in-vehicle network
32 . . . second in-vehicle network
34 . . . battery (in-vehicle power source)
36 . . . data link connector
50, 50a to 50i . . . ECUs
52 . . . first in-vehicle communication line
62 . . . second in-vehicle communication line
122 . . . computation unit (computer)
124 . . . storage unit
130 . . . external connector
134a, 134b . . . readout communication lines
136 . . . external power line
152 . . . pull-up resistor
154 . . . changeover switch
204 . . . communication line monitoring circuit (voltage monitoring circuit)
Dp . . . driving parameter data
Tx . . . transmission signals (signals with respect to the in-vehicle network)
THv . . . voltage threshold value
Vp . . . port voltage

What is claimed is:

1. A vehicle data readout device, comprising:
an external connector connected, from an exterior of a vehicle, to a data link connector that is connected to an in-vehicle network including a plurality of electronic control units;
an external power line connected to an in-vehicle power source through the data link connector and the external connector;
a readout communication line connected to an in-vehicle communication line through the data link connector and the external connector;
a computer, which is supplied with electrical power through the external power line, and is configured to read out driving parameter data from at least one of the electronic control units through the readout communication line, and store the driving parameter data in a storage unit or output the driving parameter data to outside; and
a pull-up resistor disposed between the external power line and the readout communication line;
the vehicle data readout device further comprising:
a voltage monitoring circuit configured to monitor whether or not a port voltage of the readout communication line exceeds a voltage threshold value, and to issue a notification to the computer; and
a changeover switch connected in series with the pull-up resistor,
wherein, taking as a trigger that the port voltage has risen in excess of the voltage threshold value, the vehicle data readout device switches the changeover switch from off to on, to thereby generate a pull-up state by way of the pull-up resistor, together with initiating readout of the driving parameter data by the computer;
in a state where the changeover switch is turned on, the external power line is electrically connected to the read out communication line through the changeover switch and the pull-up resistor; and
the computer:
maintains a power saving mode until reading out of the driving parameter data is started;
upon initiating readout of the driving parameter data, cancels the power saving mode, and starts transmission of signals to the in-vehicle network,
after having started readout of the driving parameter data, in a case there is no response from any of the electronic control units, stops transmission of signals to the in-vehicle network, together with switching the changeover switch from on to off to thereby cancel the pull-up state and bring about a non-pull-up state, and
when a predetermined time period has elapsed in a state with the port voltage being less than the voltage threshold value in the non-pull-up state, the computer transitions to the power saving mode.

2. The vehicle data readout device according to claim 1, wherein, when the port voltage exceeds the voltage threshold value in the non-pull-up state, the computer switches the changeover switch from off to on to thereby cause the pull-up state to occur again, together with restarting reading out of the driving parameter data.

3. A vehicle data readout method in which there is used a vehicle data readout device, comprising:
   an external connector connected, from an exterior of a vehicle, to a data link connector that is connected to an in-vehicle network including a plurality of electronic control units;
   an external power line connected to an in-vehicle power source through the data link connector and the external connector;
   a readout communication line connected to an in-vehicle communication line through the data link connector and the external connector;
   a computer, which is supplied with electrical power through the external power line, and is configured to read out driving parameter data from at least one of the electronic control units through the readout communication line, and store the driving parameter data in a storage unit or output the driving parameter data to outside; and
   a pull-up resistor disposed between the external power line and the readout communication line;
   the vehicle data readout device further comprising:
   a voltage monitoring circuit configured to monitor whether or not a port voltage of the readout communication line exceeds a voltage threshold value, and to issue a notification to the computer; and
   a changeover switch configured to control a pull-up state by switching between generation and termination of a current in the pull-up resistor;
   wherein, taking as a trigger that the port voltage has risen in excess of the voltage threshold value, the vehicle data readout method includes a step of switching the changeover switch from off to on to thereby generate the pull-up state, together with initiating readout of the driving parameter data by the computer;
   in a state where the changeover switch is turned on, the external power line is electrically connected to the read out communication line through the changeover switch and the pull-up resistor; and
   the computer:
   maintains a power saving mode until reading out of the driving parameter data is started;
   upon initiating readout of the driving parameter data cancels the power saving mode, and starts transmission of signals to the in-vehicle network;
   after having started readout of the driving parameter data, in a case there is no response from any of the electronic control units, stops transmission of signals to the in-vehicle network, together with switching the changeover switch from on to off to thereby cancel the pull-up state and bring about a non-pull-up state; and
   when a predetermined time period has elapsed in a state with the port voltage being less than the voltage threshold value in the non-pull-up state, transitions to the power saving mode.

* * * * *